US012767858B2

(12) United States Patent
Miyamura et al.

(10) Patent No.: US 12,767,858 B2
(45) Date of Patent: Oct. 20, 2026

(54) MULTILAYER SHEET AND PRODUCTION METHOD THEREOF

(71) Applicant: TOAGOSEI CO., LTD., Tokyo (JP)

(72) Inventors: Kentaro Miyamura, Nagoya (JP); Masayuki Oishi, Nagoya (JP); Makoto Imahori, Nagoya (JP); Keigo Iwatsuki, Nagoya (JP); Takashi Tsuda, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 273 days.

(21) Appl. No.: 18/572,049

(22) PCT Filed: Jun. 20, 2022

(86) PCT No.: PCT/JP2022/024552
§ 371 (c)(1),
(2) Date: Dec. 19, 2023

(87) PCT Pub. No.: WO2022/270468
PCT Pub. Date: Dec. 29, 2022

(65) Prior Publication Data

US 2024/0301246 A1 Sep. 12, 2024

(30) Foreign Application Priority Data

Jun. 21, 2021 (JP) ................................ 2021-102181

(51) Int. Cl.
*C09J 7/29* (2018.01)
*B29C 48/08* (2019.01)
(Continued)

(52) U.S. Cl.
CPC .................. *C09J 7/29* (2018.01); *B32B 7/12* (2013.01); *B32B 27/08* (2013.01); *B32B 27/285* (2013.01);
(Continued)

(58) Field of Classification Search
CPC . C09J 7/29; C09J 7/30; C09J 2301/162; C09J 2423/003; C09J 2471/006;
(Continued)

(56) References Cited

U.S. PATENT DOCUMENTS 5,314,733 A * 5/1994 Saito ......................... B32B 1/00 428/36.6
2004/0013862 A1* 1/2004 Brebion .................. B32B 27/40 428/212

(Continued)

FOREIGN PATENT DOCUMENTS

CN 110431205 A 11/2019
CN 112373161 A * 2/2021 ........... B32B 27/304

(Continued)

OTHER PUBLICATIONS

CN 112373161 A Machine Translation (Year: 2021).*

(Continued)

*Primary Examiner* — Travis M Figg
(74) *Attorney, Agent, or Firm* — Dority & Manning, PA

(57) ABSTRACT

A multilayer sheet includes: a substrate layer (A) that includes a polyphenylene ether; and an adhesive layer (B) that includes an acid-modified polyolefin, in which the multilayer sheet further includes, between the substrate layer (A) and the adhesive layer (B), a tie layer (C) that includes a polyolefin/polyphenylene ether-based alloy.

11 Claims, 2 Drawing Sheets

(51) Int. Cl.

| | |
|---|---|
| ***B29C 48/21*** | (2019.01) |
| ***B29K 23/00*** | (2006.01) |
| ***B29K 25/00*** | (2006.01) |
| ***B29K 71/00*** | (2006.01) |
| ***B32B 7/12*** | (2006.01) |
| ***B32B 27/08*** | (2006.01) |
| ***B32B 27/28*** | (2006.01) |
| ***B32B 27/30*** | (2006.01) |
| ***B32B 27/32*** | (2006.01) |
| ***C09J 7/30*** | (2018.01) |
| ***H01M 50/129*** | (2021.01) |

(52) U.S. Cl.

CPC ............ *B32B 27/302* (2013.01); *B32B 27/32* (2013.01); *C09J 7/30* (2018.01); *B29C 48/08* (2019.02); *B29C 48/21* (2019.02); *B29K 2023/00* (2013.01); *B29K 2025/06* (2013.01); *B29K 2071/12* (2013.01); *B29K 2995/0012* (2013.01); *B29K 2995/0077* (2013.01); *B29K 2995/0097* (2013.01); *B32B 2270/00* (2013.01); *B32B 2307/308* (2013.01); *B32B 2307/7376* (2023.05); *B32B 2307/748* (2013.01); *C09J 2301/162* (2020.08); *C09J 2423/003* (2013.01); *C09J 2471/006* (2013.01); *H01M 50/129* (2021.01)

(58) Field of Classification Search

CPC ......... B32B 7/12; B32B 27/08; B32B 27/285; B32B 27/302; B32B 27/32; B32B 2307/7376; B32B 2270/00; B32B 2307/308; B32B 2307/748; B29C 48/08; B29C 48/21; H01M 50/129; B29K 2023/00; B29K 2025/06; B29K 2071/12; B29K 2995/0012; B29K 2995/0077; B29K 2995/0097

See application file for complete search history.

(56) References Cited

U.S. PATENT DOCUMENTS

| | | | | |
|---|---|---|---|---|
| 2007/0059518 | A1* | 3/2007 | Tanaka | B32B 27/18 427/372.2 |
| 2007/0275197 | A1* | 11/2007 | Chow | B32B 27/306 524/502 |
| 2011/0223703 | A1* | 9/2011 | Doi | B32B 27/08 428/212 |
| 2013/0202847 | A1* | 8/2013 | Konokawa | C08L 27/16 428/141 |
| 2018/0230345 | A1* | 8/2018 | Takeda | B32B 7/06 |
| 2018/0272780 | A1* | 9/2018 | Akiyama | B44C 1/1725 |
| 2018/0370286 | A1* | 12/2018 | Nakakita | C08L 23/14 |
| 2019/0027286 | A1* | 1/2019 | Tada | H01F 1/053 |

FOREIGN PATENT DOCUMENTS

| | | | |
|---|---|---|---|
| JP | H04364950 | A | 12/1992 |
| JP | H0912804 | A | 1/1997 |
| JP | 2013060521 | A | 4/2013 |
| JP | 2013060531 | A | 4/2013 |
| JP | 2014019125 | A | 2/2014 |
| JP | 2014148584 | A | 8/2014 |
| JP | 2015059198 | A | 3/2015 |
| JP | 2017109613 | A | 6/2017 |
| WO | WO 2011013389 | A1 | 2/2011 |

OTHER PUBLICATIONS

Chinese Office Action (w/English translation) for corresponding Application No. 202280044016.5, dated Oct. 11, 2025, 14 pages.
International Search Report (with English translation) and Written Opinion received in corresponding Application No. PCT/JP2022/024552, dated Aug. 9, 2022, 7 pages.

* cited by examiner

MULTILAYER SHEET AND PRODUCTION METHOD THEREOF

CROSS-REFERENCE TO RELATED APPLICATIONS

The present application is related and has right of priority to JP 2021-102181, which was filed on Jun. 21, 2021 in the Japanese Patent Office, and is a U.S. national phase entry of PCT/JP2022/024552, which was filed on Jun. 20, 2022, both of which are incorporated by reference in their entireties for all purposes.

TECHNICAL FIELD

The present invention relates to a multilayer sheet excellent in adhesiveness and heat resistance, which can be used for bonding and sealing various parts and which itself can be used as a sheet-shaped member, and a production method thereof.

BACKGROUND ART

In recent years, hot-melt adhesive compositions have come to be used as adhesive films or sheets (hereinafter, collectively referred to as "adhesive members") for chemical batteries such as lithium-ion batteries and fuel cells incorporated in notebook computers, smartphones, tablets, and automobiles, as well as physical batteries such as solar cells and capacitors. In order to bond metal substrates such as iron, aluminum, titanium, other metals, and alloys thereof, which are used as substrates for constituent members of these batteries, it is known that relatively good adhesion strength can be obtained by using hot-melt adhesive compositions containing acid-modified olefin-based thermoplastic resins (hereinafter, also referred to as "acid-modified polyolefins") as main components.

For battery applications, hot-melt adhesive compositions are required to have durability to battery constituent materials in addition to adhesion strength. In lithium-ion batteries, lithium hexafluorophosphate used as electrolytes may react with moisture to generate hydrofluoric acid and, in fuel cells, acids such as hydrofluoric acid may be generated from electrolyte membranes, which are constituent members of batteries, so acid resistance is required. Furthermore, lithium-ion batteries require durability against ethylene carbonate, diethyl carbonate, or the like used as solvents for electrolytes, and nickel-hydrogen batteries require durability against strong alkaline aqueous solutions. Further, in fuel cells, cooling liquids containing ethylene glycol, propylene glycol, or the like are circulated inside cells for the purpose of cooling cells that have generated heat due to power generation, so durability against ethylene glycol or the like is also required.

Patent Document 1 discloses a resin composition composed of 50 to 99% by mass of a low-viscosity propylene-based polymer that satisfies specific properties and 1 to 50% by mass of an acid-modified propylene-based elastomer that satisfies specific properties, as well as a hot-melt adhesive including the resin composition. It has excellent adhesiveness to polyolefin-based substrates and also has excellent adhesion strength to metal substrates. Patent Document 2 describes an acid-modified polypropylene as an adhesive between metal and nylon resin.

By layering acid-modified polyolefin-based adhesive films or sheets on substrate layers to form multilayer sheets, it is also possible to obtain adhesive members with even higher performance and functionality. Engineering plastics having excellent rigidity and heat resistance are used for substrate layers of multilayer sheets. By configuring acid-modified polyolefin-based adhesives as such multilayer sheets, strength, rigidity, gas barrier properties, chemical resistance, acid/alkali resistance, heat resistance, etc. are improved, and can be suitably used for applications that require these durability, such as lithium-ion batteries and fuel cells described above. In addition, by using multilayer sheets as adhesive members for lithium-ion batteries and fuel cells, it is possible to reduce the number of constituent members and parts, thereby reducing costs and improving productivity.

As engineering plastics used as substrates for multilayer sheets, polyethylene naphthalate, heat-resistant polyolefins such as cycloolefin polymers, polyphenylene ether-based alloys, and aromatic polyamide resins have been used in terms of heat resistance, rigidity, dimensional stability, and cost. For example, Patent Document 3 describes a layered sheet for sealing an electronic device, in which a first sheet and a second sheet are layered, the first sheet includes an acid-modified polyolefin thermoplastic resin, the second sheet has a higher melting point than that of the first sheet, and the peel strength of the second sheet to the first sheet at 25° C. is from 0.5 to 10.0 [N/15 mm]. Patent Document 3 describes polyethylene naphthalate as a specific example of the second sheet.

PRIOR ART DOCUMENT

Patent Document

Patent Document 1: Japanese Patent Application Laid-Open (JP-A) No. 2013-060521

Patent Document 2: Japanese Patent Application Laid-Open (JP-A) No. 2017-109613

Patent Document 3: International Publication No. 2011/013389

SUMMARY OF INVENTION

Technical Problem

As described above, multilayer sheets are used as adhesive members, in which adhesive layers that include acid-modified polyolefins and substrate layers that include engineering plastics such as polyethylene naphthalate, heat-resistant polyolefins such as cycloolefin polymers, polyphenylene ethers, or aromatic polyamide resins are layered. However, polyethylene naphthalate and aromatic polyamide resins are hydrolyzed when used for a long period of time, and have a problem of durability in an environment where they come into contact with moisture. Cycloolefin polymers have a problem that the compression bonding temperature is restricted because the softening point is not sufficiently high. In addition, since cycloolefin polymers have low toughness, problems such as cracking tend to occur during long-term use.

Although polyphenylene ethers do not have problems with deterioration during long-term use that are seen in other engineering plastics, they have a serious problem of not adhering to acid-modified polyolefins used for adhesive layers and being easily delaminated.

The problem to be solved by the present invention is to provide a multilayer sheet including an adhesive layer that includes an acid-modified polyolefin and a substrate layer that includes a polyphenylene ether, and having high inter-layer peel strength.

Solution to Problem

The present inventors have made intensive studies to solve the aforementioned problem in developing a multilayer sheet including an adhesive layer that includes an acid-modified polyolefin and a substrate layer that includes a polyphenylene ether. Specifically, the present invention was completed by newly providing a tie layer with excellent adhesion strength between an adhesive layer including an acid-modified polyolefin and a substrate layer including a polyphenylene ether, studying various resin materials based on the idea of bonding the adhesive layer and the substrate layer by the tie layer, and discovering a resin composition suitable for the tie layer.

The means for solving the aforementioned problem include the following aspects.

[1] A multilayer sheet, including:

a substrate layer (A) that includes a polyphenylene ether; and an adhesive layer (B) that includes an acid-modified polyolefin, in which the multilayer sheet further includes, between the substrate layer (A) and the adhesive layer (B), a tie layer (C) that includes a polyolefin/polyphenylene ether-based alloy.

[2] The multilayer sheet according to [1], in which the substrate layer (A) includes 40 to 99.9% by mass of the polyphenylene ether, 0 to 59.9% by mass of a polystyrene, and a polymer that is different from the polyphenylene ether and from the polystyrene.

[3] The multilayer sheet according to [1] or [2], in which the substrate layer (A) has a softening point of 175° C. or higher.

[4] The multilayer sheet according to any one of [1] to [3], in which the substrate layer (A) has a storage modulus at 160° C. of 500 MPa or more.

[5] The multilayer sheet according to any one of [1] to [4], in which the acid-modified polyolefin is a maleic anhydride-modified polyolefin.

[6] The multilayer sheet according to any one of [1] to [5], in which a mass ratio of the polyolefin to the polyphenylene ether contained in the tie layer (C) is from 15/85 to 80/20.

[7] The multilayer sheet according to any one of [1] to [6], in which the tie layer (C) includes a styrene-diene block copolymer, a hydrogenated product of a styrene-diene block copolymer, or a polystyrene.

[8] The multilayer sheet according to any one of [1] to [7], in which the substrate layer (A) has a thickness of from 50 to 300 μm, the adhesive layer (B) has a thickness of from 10 to 100 μm, and the tie layer has a thickness of from 2 to 50 μm.

[9] A method of producing a multilayer sheet, the method including:

a step (1) of preparing a substrate layer (A) that includes a polyphenylene ether, an adhesive layer (B) that includes an acid-modified polyolefin, and a tie layer (C) that includes a polyolefin/polyphenylene ether-based alloy;

a step (2) of bringing the substrate layer (A) and the tie layer (C) into contact with each other in a molten state of 160° C. or higher of at least one of the substrate layer (A) or the tie layer (C); and a step (3) of, at the same time as or a different time from the step (2), bringing the tie layer (C) and the adhesive layer (B) into contact with each other in a molten state of 160° C. or higher of at least one of the tie layer (C) or the adhesive layer (B).

Advantageous Effects of Invention

According to the present invention, it is possible to provide a multilayer sheet including an adhesive layer that includes an acid-modified polyolefin and a substrate layer that includes a polyphenylene ether, and having high inter-layer peel strength.

By providing a tie layer that includes a polyolefin/polyphenylene ether-based alloy as a main component between an adhesive layer and a substrate layer, the interface between the adhesive layer and the substrate layer is strongly adhered and a multilayer sheet with excellent adhesion strength and heat resistance can be produced. This makes it possible to provide a high-performance and economical sheet-like battery member and the like.

DESCRIPTION OF EMBODIMENTS

Figure 1:
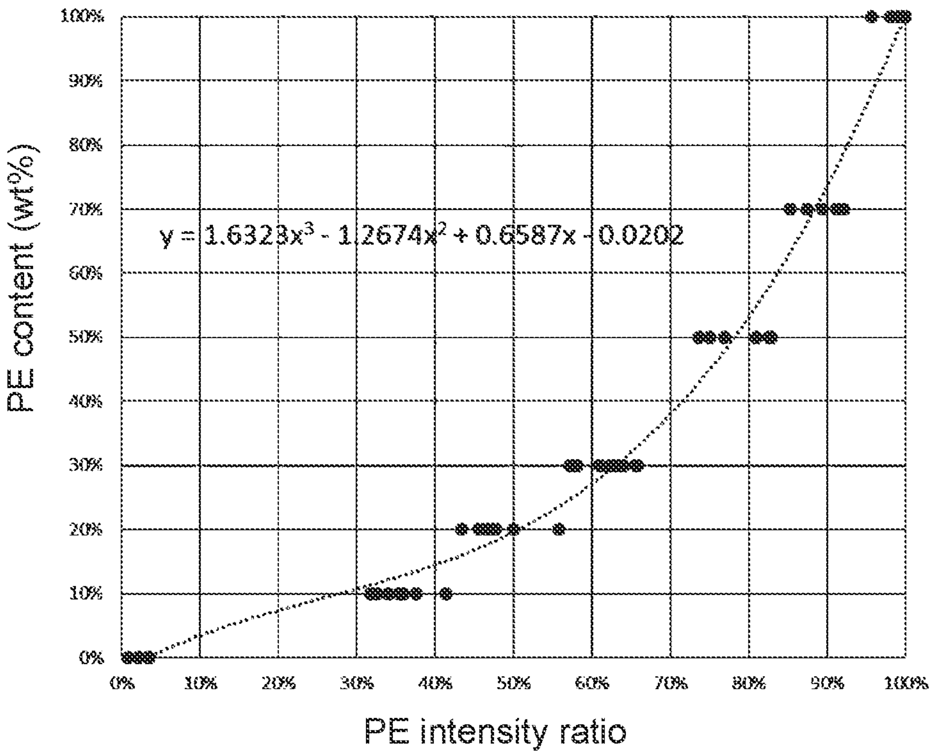
FIG. 1 is a calibration curve for converting the absorbance ratio of ethylene units to propylene units into mass ratio.

The multilayer sheet of the present invention includes a substrate layer (A) that includes a polyphenylene ether and an adhesive layer (B) that includes an acid-modified polyolefin, in which the multilayer sheet further includes, between the substrate layer (A) and the adhesive layer (B), a tie layer (C) that includes a polyolefin/polyphenylene ether-based alloy. The tie layer is a layer that is placed between the substrate layer and the adhesive layer to strongly adhere them, which increases the peel strength of the multilayer sheet. The substrate layer (A) is an intermediate layer or a surface layer, the adhesive layer (B) is a surface layer, and the tie layer (C) is an intermediate layer. The surface layer is a layer arranged as either an upper surface or a lower surface, and the intermediate layer is a layer other than the surface layer. When the adhesive layer (B) is provided on only one surface layer, only the tie layer (C) serves as an intermediate layer, and both the substrate layer (A) and the adhesive layer (B) may be surface layers. Examples of typical layer configurations include a three-layer sheet of substrate layer (A)/tie layer (C)/adhesive layer (B) and a five-layer sheet of adhesive layer (B)/tie layer (C)/substrate layer (A)/tie layer (C)/adhesive layer (B).

The substrate layer (A) includes a polyphenylene ether. The polyphenylene ether is typically a homopolymer or copolymer that includes monomer units represented by the following formula.

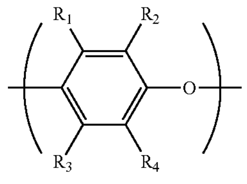

In the formula, $R_1$ to $R_4$ are each selected from H or an alkyl group having 1 to 6 carbon atoms, $R_1$ and $R_3$ are each preferably H, and $R_2$ and $R_4$ are each preferably $CH_3$.

The mass ratio of the polyphenylene ether in the substrate layer (A) is preferably 50% by mass or more, more preferably 60% by mass or more, particularly preferably 70% by mass or more, and may be 100% by mass. When the mass ratio of the polyphenylene ether in the substrate layer (A) falls within such a range, the heat resistance of the multilayer sheet can be improved. The upper limit of the mass ratio of the polyphenylene ether in the substrate layer (A) is not particularly limited. For example, when a polymer other than the polyphenylene ether is used in the substrate layer (A), the mass ratio of the polyphenylene ether in the substrate layer (A) is preferably 99.9% by mass or less, more preferably 98% by mass or less, and particularly preferably 95% by mass or less. When the mass ratio of the polyphenylene ether falls within such a range, the moldability of the multilayer sheet can be improved.

The substrate layer (A) may further include a polystyrene. The polystyrene is an optional component, and the substrate layer (A) may not include a polystyrene. The mass ratio of the polystyrene in the substrate layer (A) is preferably 50% by mass or less, more preferably 40% by mass or less, and particularly preferably 30% by mass or less. When the mass ratio of the polystyrene falls within such a range, the heat resistance of the multilayer sheet can be improved.

Typical examples of the polystyrene include general-purpose polystyrene (GPPS), which is a polymer of styrene only, and high-impact polystyrene (HIPS), which is GPPS added with rubber to provide impact resistance, but a copolymer of styrene with acrylonitrile or a (meth)acrylic acid ester can also be used therefor. The copolymer used as the polystyrene includes monomer units derived from styrene as main components (for example, 50% by mass or more of all monomer units). When the polystyrene is a copolymer, the mass ratio of monomer units derived from comonomers other than styrene in the polystyrene is preferably 20% by mass or less, and more preferably 10% by mass or less. When the mass ratio of monomer units derived from comonomers is 20% by mass or less, the compatibility with the polyphenylene ether is improved and phase separation can be prevented.

The total amount of the polyphenylene ether and the polystyrene in the substrate layer (A) is preferably 60% by mass or more, and more preferably 70% by mass or more. The upper limit of the total amount of the polyphenylene ether and the polystyrene in the substrate layer (A) is not particularly limited. In one embodiment of the present invention, the total amount of the polyphenylene ether and the polystyrene in the substrate layer (A) is preferably 99.9% by mass or less, more preferably 98% by mass or less, and still more preferably 95% by mass or less.

A polymer other than the polyphenylene ether and the polystyrene (hereinafter, referred to as other polymer (A)) can be added to the substrate layer (A) for the purpose of improving toughness at low temperature and molding stability, improving adhesiveness with the tie layer (C), and the like.

Examples of other polymer (A) include: styrene block copolymers such as styrene-butadiene-styrene block copolymers and hydrogenated products thereof, and styrene-isoprene-styrene block copolymers and hydrogenated products thereof; and graft copolymers obtained by grafting styrene homopolymers or copolymers to polyolefins. These copolymers include styrene units as subcomponents (for example, 40% by mass or less of all monomer units). Having a polystyrene chain enables other polymer (A) to have high miscibility with the polyphenylene ether. These block copolymers and graft copolymers may be copolymers in which functional groups such as carboxylic acid (anhydride) groups, epoxy groups, and amino groups are added by acid modification with maleic anhydride or the like, epoxy modification using an oxidizing agent, terminal amine modification, etc. These functional groups may be effective in improving interfacial adhesion strength with the tie layer.

As another example of other polymer (A), an unmodified or acid-modified polyolefin such as polyethylene, polypropylene, or ethylene-propylene copolymer may be used. By including a polyolefin in the substrate layer (A), improvement in toughness and chemical resistance can be expected. Since these polyolefins are incompatible with the polyphenylene ether, it is preferable to use the aforementioned block copolymer or graft copolymer including styrene units as a compatibilizer.

When other polymer (A) is used, the content of other polymer (A) in the substrate layer (A) may be, for example, 0.1% by mass or more and is preferably 1% by mass or more, more preferably 2% by mass or more, and particularly preferably 3% by mass or more. When the addition amount falls within such a range, the improvement effect of other polymer (A) is enhanced.

When other polymer (A) is used, the content of other polymer (A) in the substrate layer (A) is preferably 30% by mass or less, more preferably 20% by mass or less, and particularly preferably 10% by mass or less. When the addition amount falls within such a range, the multilayer sheet can have high heat resistance and high adhesion strength at high temperature.

When other polymer (A) is used, the substrate layer (A) may include 40 to 99.9% by mass of the polyphenylene ether and 0 to 59.9% by mass of the polystyrene. From the viewpoint of improving the moldability and the heat resistance of the multilayer sheet, the substrate layer (A) preferably includes 50 to 98% by mass of the polyphenylene ether and 0 to 50% by mass of the polystyrene, and more preferably includes 60 to 95% by mass of the polyphenylene ether and 0 to 40% by mass of the polystyrene.

The softening point of the substrate layer (A) is preferably 175° C. or higher, more preferably 180° C. or higher, and particularly preferably 185° C. or higher. When the softening point falls within this range, the heat resistance of the multilayer sheet is improved.

The storage modulus of the substrate layer (A) at 160° C. is preferably 500 MPa or more, more preferably 700 MPa or more, and particularly preferably 1000 MPa or more. The storage modulus of the substrate layer (A) at 170° C. is preferably 500 MPa or more, more preferably 700 MPa or more, and particularly preferably 1000 MPa or more. When the storage modulus at the temperature range is 500 MPa or more, the multilayer sheet can be prevented from being deformed or damaged by thermocompression bonding during adhesion.

From the viewpoint of heat resistance, the thickness change rate of the substrate layer (A) in a compression creep test is preferably 30% or less, more preferably 25% or less, and particularly preferably 20% or less. The thickness change rate is measured according to the method described in Examples shown below.

From the viewpoint of heat resistance, the thermal change rate of the substrate layer (A) in a thermal shrinkage test is preferably 0.50% or less, more preferably 0.30% or less, and particularly preferably 0.20% or less. The thermal change rate is measured according to the method described in Examples shown below.

The softening point and the storage modulus in the present invention are values obtained using a tensile viscoelasticity apparatus (DMS6100, manufactured by Hitachi High-Tech Science Corporation). Specifically, the temperature is raised from room temperature to 250° C. at a frequency of 1 Hz and a temperature rising rate of 2° C./min, and changes in storage modulus, loss modulus, and tan δ due to temperature are recorded. The softening point as used in the present invention means a temperature at which the value of tan δ shows the maximum value.

The melt flow rate of the substrate layer (A) is preferably 1 g/10 min or more, and more preferably 2 g/10 min or more. The melt flow rate of the substrate layer (A) is preferably 50 g/10 min or less, and more preferably 30 g/10 min or less. If the melt flow rate of the substrate layer (A) is below the lower limit, the melt viscosity becomes high and sheet molding becomes difficult. If the melt flow rate is above the upper limit, the melt tension becomes too low and sheet molding becomes also difficult.

The melt flow rate is a value measured according to JIS K7210:2014. The melt flow rate of the substrate layer (A) is measured at a resin temperature of 300° C. and a load of 2.16 kg.

The substrate layer (A) may further include an additive selected from the group consisting of antioxidants, ultraviolet absorbers, fillers, reinforcing fibers, release agents, processing aids, flame retardants, plasticizers, nucleating agents, antistatic agents, pigments, dyes, foaming agents, and combinations thereof.

The adhesive layer (B) of the present invention includes an acid-modified polyolefin. The acid-modified polyolefin is a polyolefin that is obtained by graft-modifying an unmodified polyolefin (hereinafter, also simply referred to as "polyolefin") with an acid compound selected from the group consisting of unsaturated carboxylic acids, unsaturated carboxylic acid anhydrides, and combinations thereof.

Examples of monomer units constituting the polyolefin include monomer units derived from monomers selected from the group consisting of: α-olefins such as ethylene, propylene, 1-butene, 1-pentene, 1-hexene, and 4-methyl-1-pentene; diene monomers such as butadiene, isoprene, and chloroprene; aromatic vinyl compounds such as styrene; and combinations thereof. The number of carbon atoms in the monomer is preferably from 2 to 10, and more preferably from 2 to 5.

Among these, polyolefins selected from the group consisting of polymer blends of polyethylene and polypropylene, ethylene-propylene copolymers, and combinations thereof are preferred because they have high adhesion strength to adherends.

The polyethylene is a polymer including ethylene units as a main component, and may be a homopolymer or may be a copolymer. In the case of a copolymer, the content of ethylene units in the polyethylene is preferably 50% by mass or more, and may be 70% by mass or more. Specific examples of the polyethylene include: homopolymers such as low-density polyethylene, high-density polyethylene, and linear low-density polyethylene; copolymers such as ethylene-diene monomer copolymers, ethylene-vinyl acetate copolymers, ethylene-acrylic acid ester copolymers, and ethylene-methacrylic acid ester copolymers; and halogen-modified products such as chlorinated polyethylene.

The polypropylene is a polymer including propylene units as a main component, and may be a homopolymer or may be a copolymer. In the case of a copolymer, the content of propylene units in the polypropylene is preferably 50% by mass or more, and may be 70% by mass or more. Specific examples of polypropylene include: homopolymers such as amorphous polypropylene and crystalline polypropylene; copolymers such as propylene-diene monomer copolymers; and halogen modified products such as chlorinated polypropylene.

The ethylene-propylene copolymer is a polymer including ethylene units and propylene units, and may be composed of only ethylene units and propylene units, or may further include other monomer units in addition to ethylene units and propylene units. Examples of ethylene-propylene copolymers including other monomer units include ethylene-propylene-diene monomer copolymers. The total amount of ethylene units and propylene units in the ethylene-propylene copolymer is preferably 50% by mass or more, more preferably 70% by mass or more, still more preferably 80% by mass or more, particularly preferably 90% by mass or more, and may be 100% by mass.

In addition to physical blends consisting of multiple components of these resins, polyolefins encompass reaction blends in which functional groups are reacted between different polymers in a molding machine, graft copolymers and block copolymers consisting of multiple segments, and compositions in which physical blends using these as compatibilizers are microdispersed.

In all the monomer units contained in the polyolefin, the total amount of ethylene units and propylene units is preferably 50% by mass or more, more preferably 70% by mass or more, still more preferably 80% by mass or more, particularly preferably 90% by mass or more, and may be 100% by mass.

The mass ratio of ethylene units to propylene units contained in the polyolefin (ethylene units/propylene units) is preferably from 10/90 to 40/60, and more preferably from 15/85 to 35/65. When the mass ratio of ethylene units is equal to or more than the lower limit of this range, the thermocompression bondability of the acid-modified polyolefin can be improved, and the adhesion strength can be improved. When the mass ratio of ethylene units is equal to or less than the upper limit of this range, the adhesion strength at high temperature can be improved. When the mass ratio of ethylene units to propylene units falls within the range shown above, it is possible to achieve both adhesion durability at high temperature and adhesion durability at low temperature. When the polyolefin is a polymer blend of polyethylene and polypropylene, the "mass ratio of ethylene units to propylene units contained in the polyolefin" means a mass ratio of ethylene units to propylene units with respect to all ethylene units and propylene units contained in the polyethylene and the polypropylene.

The mass ratio of ethylene units to propylene units is determined from the absorbance ratio of the characteristic absorption of polyethylene (719 $cm^{-1}$) and the characteristic absorption of polypropylene (1167 $cm^{-1}$) in the IR spectrum. Specifically, a calibration curve is used to convert the absorbance ratio of ethylene units to propylene units into mass ratio. The calibration curve can be created by blending commercially available polyethylene and polypropylene at various ratios and plotting the blending ratio and the absorbance ratio. Specifically, refer to Examples described later.

Each of the polyethylene, the polypropylene, and the ethylene-propylene copolymer may include monomer units other than ethylene units and propylene units. Examples of other monomers that form monomer units other than ethylene units and propylene units include: α-olefins such as 1-butene, 1-pentene, 1-hexene, and 4-methyl-1-pentene; diene monomers such as butadiene, isoprene, and chloroprene; unsaturated carboxylic acids and derivatives thereof such as vinyl acetate, acrylic acid esters, acrylic acid, methacrylic acid, and methacrylic acid esters; and aromatic vinyl compounds such as styrene. The content of monomer units other than ethylene units and propylene units in the polyolefin is preferably 30% by mass or less, more preferably 20% by mass or less, and particularly preferably 10% by mass or less. When the content of monomer units other than ethylene units and propylene units falls within such a range, properties such as water resistance, chemical resistance, and durability of polyolefin are enhanced, and polyolefin can be produced at low cost.

Examples of methods of producing the polyolefin include known production methods using a polymerization catalyst. Examples of polymerization catalysts include Ziegler catalysts and metallocene catalysts, and examples of polymerization methods include slurry polymerization and gas phase polymerization. Impact resistant polypropylene, referred to as polypropylene block polymer, is substantially a mixture of polypropylene and propylene-ethylene random copolymer, and can be produced by a process of a first step to obtain a homopolymer of propylene and a second step to obtain a propylene-ethylene random copolymer.

The acid compound used in producing the acid-modified polyolefin is selected from the group consisting of unsaturated carboxylic acids, unsaturated carboxylic acid anhydrides, and combinations thereof.

The unsaturated carboxylic acid is a compound having an ethylenic double bond and a carboxylic acid group in the same molecule, and examples thereof include various unsaturated monocarboxylic acids and unsaturated dicarboxylic acids. These acid compounds may be used singly or in combination of two or more.

Specific examples of unsaturated monocarboxylic acids include acrylic acid, methacrylic acid, crotonic acid, and isocrotonic acid.

Specific examples of unsaturated dicarboxylic acids include maleic acid, fumaric acid, itaconic acid, citraconic acid, nadic acid, and endic acid.

The unsaturated carboxylic acid anhydride is a compound having an ethylenic double bond and a carboxylic acid anhydride group in the same molecule, and examples thereof include acid anhydrides of the aforementioned unsaturated dicarboxylic acids. Specific examples of acid anhydrides of unsaturated dicarboxylic acids include maleic anhydride, fumaric anhydride, itaconic anhydride, citraconic anhydride, nadic anhydride, and endic anhydride.

Among these, maleic acid and maleic anhydride are preferably used, and maleic anhydride is particularly preferably used, because of its high modification effect.

A known method can be adopted as a graft modification method. Examples thereof include a method of graft-reacting, in a molten state or in a solution state, an acid compound with a polyolefin in the presence of a radical polymerization initiator such as an organic peroxide or an aliphatic azo compound.

The graft reaction temperature is preferably from 80 to 160° C. when reacting in a solution state, and is preferably from 150 to 300° C. when reacting in a molten state. In each of the solution state and the molten state, the reaction rate increases at a temperature equal to or higher than the lower limit of the aforementioned reaction temperature range, and decrease in the molecular weight of the resin can be suppressed at a temperature equal to or lower than the upper limit of the aforementioned reaction temperature range, by which the mechanical strength of the resulting acid-modified polyolefin can be maintained.

The radical polymerization initiator to be used may be selected from commercially available organic peroxides in consideration of the reaction temperature or the like.

If the acid compound used for graft modification is partially unreacted, it is preferable to remove the unreacted acid compound by a known method such as distillation under reduced pressure in order to suppress adverse effects on adhesion strength.

The amount of the acid compound grafted to the acid-modified polyolefin is preferably 0.2% by mass or more, more preferably 0.4% by mass or more, and particularly preferably 0.6% by mass or more. When the amount of the grafted acid compound falls within such a range, the adhesiveness of the adhesive layer (B) can be enhanced.

The amount of the acid compound grafted to the acid-modified polyolefin is preferably 5% by mass or less, more preferably 2% by mass or less, and particularly preferably 1% by mass or less. When the amount of the grafted acid compound falls within such a range, deterioration of physical properties due to reduction in molecular weight can be suppressed.

In this specification, the amount of the acid compound grafted to the acid-modified polyolefin is defined by the following formula from the acid value of the acid-modified polyolefin.

$$\text{Graft amount (\% by mass)} = \text{acid value} \times M \times 100/(1000 \times 56.1 \times V)$$

In the formula, M and V are each defined by the following formulae.

$$M = (\text{molecular weight of acid compound}) + (\text{number of unsaturated groups in acid compound}) \times 1.008$$

V=valence of acid group (however, when an acid anhydride group is contained, it is a valence of the acid group when the acid anhydride group is completely hydrolyzed)

The acid value indicates the number of milligrams of potassium hydroxide required to neutralize the acid contained in 1 g of the sample, and is measured according to JIS K 0070:1992.

The melting point of the acid-modified polyolefin is preferably 130° C. or higher, and more preferably 135° C. or higher. When the melting point of the acid-modified polyolefin falls within such a range, the heat resistance and adhesion strength at high temperature of the adhesive layer (B) can be improved.

The melting point of the acid-modified polyolefin is preferably 160° C. or lower, and more preferably 150° C. or lower. When the melting point of the acid-modified polyolefin falls within such a range, good thermocompression bondability can be obtained, and adhesion durability at low temperature can be improved.

In the present invention, the melting point means a temperature at the top of the endothermic peak generated in the process of once holding at 180° C. for several minutes, followed by cooling to 0° C., and then raising to 200° C. by 10° C. per minute using a differential scanning calorimeter (DSC).

The melt flow rate of the acid-modified polyolefin is preferably 3 g/10 min or more, and more preferably 7 g/10 min or more. The melt flow rate of the acid-modified polyolefin is preferably 50 g/10 min or less, and more preferably 30 g/10 min or less.

In the present invention, the melt flow rate is a value measured according to JIS K7210:2014. The melt flow rate of the adhesive layer (B) is measured at a resin temperature of 230° C. and a load of 2.16 kg.

The content of the acid-modified polyolefin in the adhesive layer (B) may be 2% by mass or more. For example, the acid-modified polyolefin may be used by mixing with an unmodified polyolefin. When an acid-modified polyolefin with a high degree of acid modification is used, the acid-modified polyolefin may be used at a small amount of about 2% by mass. In one embodiment, the content of the acid-modified polyolefin in the adhesive layer (B) is preferably 30% by mass or more, more preferably 70% by mass or more, particularly preferably 90% by mass or more, and may be 100% by mass.

A polymer other than the acid-modified polyolefin (hereinafter, referred to as other polymer (B)) can be added to the adhesive layer (B) for the purpose of improving adhesion strength at low temperature, adhesion durability, molding stability, adhesiveness with the substrate layer (A), and the like. Examples of other polymer (B) include: styrene-based block copolymers such as styrene-butadiene-styrene block copolymers and hydrogenated products thereof, styrene-isoprene-styrene block copolymers and hydrogenated products thereof, and styrene-isobutylene-styrene block copolymers; and styrene-based graft copolymers obtained by grafting styrene homopolymers or copolymers to polyolefins. Also, an unmodified polyolefin such as polyethylene, polypropylene, and ethylene-propylene copolymer may be added as other polymer (B).

When other polymer (B) is used, the lower limit of the content of other polymer (B) in the adhesive layer (B) is preferably 1% by mass or more, more preferably 2% by mass or more, and particularly preferably 3% by mass or more. When the addition amount falls within such a range, the improvement effect of other polymer (B) is enhanced.

When other polymer (B) is used, the upper limit of the content of other polymer (B) in the adhesive layer (B) is preferably 50% by mass or less, more preferably 30% by mass or less, and particularly preferably 10% by mass or less. When the addition amount falls within such a range, the adhesive layer (B) can obtain high heat resistance and high adhesion strength at high temperature. As described above, when an acid-modified polyolefin having a high degree of acid modification is used, the content of the acid-modified polyolefin can be reduced. In such cases, the content of the unmodified polyolefin may be high, and the upper limit of the content of the unmodified polyolefin in the adhesive composition may be 98% by mass.

The adhesive layer (B) may further include an additive selected from the group consisting of antioxidants, ultraviolet absorbers, fillers, reinforcing fibers, release agents, processing aids, flame retardants, plasticizers, nucleating agents, antistatic agents, pigments, dyes, foaming agents, and combinations thereof.

The tie layer (C) includes a polyolefin/polyphenylene ether-based alloy. As used herein, the term "polyolefin/polyphenylene ether-based alloy" refers to a polymer alloy including a polyolefin and a polyphenylene ether. When a polypropylene is used as the polyolefin, the polyolefin/polyphenylene ether-based alloy can also be described as a polypropylene/polyphenylene ether-based alloy. The polymer alloy is a composite resin material in which two or more polymers are mixed. The mass ratio of the polyolefin to the polyphenylene ether (polyolefin/polyphenylene ether) in the tie layer (C) is preferably 15/85 or more, more preferably 20/80 or more, and particularly preferably 25/75 or more. When the mass ratio of the polyolefin to the polyphenylene ether falls within these ranges, the tie layer (C) can be strongly adhered to the adhesive layer (B). The mass ratio of the polyolefin to the polyphenylene ether (polyolefin/polyphenylene ether) in the tie layer (C) is preferably 80/20 or less, more preferably 70/30 or less, and particularly preferably 60/40 or less. When the mass ratio of the polyolefin to the polyphenylene ether falls within these ranges, the tie layer (C) can be strongly adhered to the substrate layer (A). The mass ratio of the polyolefin to the polyphenylene ether can be determined from the absorbance ratio of their respective characteristic absorptions in the IR spectrum. For example, when a polypropylene is used as the polyolefin, the mass ratio of the polypropylene to the polyphenylene ether is determined from the absorbance ratio of the characteristic absorption of polypropylene (2920 $cm^{-1}$) and the characteristic absorption of polyphenylene ether (1604 $cm^{-1}$) in the IR spectrum. Specifically, a calibration curve is used to convert the absorbance ratio of the polypropylene to the polyphenylene ether into mass ratio. The calibration curve can be created by blending commercially available polypropylene and polyphenylene ether at various ratios and plotting the blending ratio and the absorbance ratio. Specifically, refer to Examples described later.

The total amount of the polyolefin and the polyphenylene ether in the tie layer (C) is preferably 50% by mass or more, more preferably 70% by mass or more, and may be 100% by mass.

Since the polyolefin and the polyphenylene ether are not compatible with each other, the miscibility of both resins may be improved by adding a compatibilizer to the tie layer (C) or introducing a functional group through chemical modification (modification) to the polyolefin or the polyphenylene ether, etc.

Styrene-diene block copolymers and hydrogenated products thereof are used as typical compatibilizers. Specific examples thereof include styrene-butadiene diblock copolymers, styrene-butadiene-styrene triblock copolymers, styrene-isoprene diblock copolymers, styrene-isoprene-styrene triblock copolymers, and hydrogenated products thereof. Among these block copolymers, a styrene-ethylene-butylene block copolymer, which is a hydrogenated product of a styrene-butadiene block copolymer, and a styrene-ethylene-propylene block copolymer, which is a hydrogenated product of a styrene-isoprene block copolymer, are preferably used. Because commercially available products are easily available, a styrene-ethylene-butylene-styrene triblock copolymer (hereinafter, sometimes abbreviated as SEBS) and a styrene-ethylene-propylene-styrene triblock copolymer (hereinafter, sometimes abbreviated as SEPS) are particularly preferably used.

Examples of chemical modification (modification) include a method of introducing a polar group into the polyolefin or the polyphenylene ether through a grafting reaction of maleic anhydride to impart polar interactions such as hydrogen bonds and ionic bonds.

Examples of monomer units constituting the polyolefin include monomer units derived from monomers selected from the group consisting of α-olefins such as ethylene, propylene, 1-butene, 1-pentene, 1-hexene, and 4-methyl-1-pentene, diene monomers such as butadiene, isoprene, and chloroprene, aromatic vinyl compounds such as styrene, and combinations thereof.

As the polyolefin, a polypropylene is particularly preferred. That is, the polyolefin/polyphenylene ether-based alloy is preferably a polypropylene/polyphenylene ether-based alloy. The polypropylene is a polymer containing propylene units as main components, and may be a homopolymer, a copolymer, or an alloy or blend with other polymer components. When the polypropylene is a copolymer or alloy, the content of propylene units is preferably 60% by mass or more, and more preferably 75% by mass or more.

Specific examples of the polypropylene include: homopolymers such as amorphous polypropylene and crystalline polypropylene; copolymers of which main component is propylene such as ethylene-propylene copolymers and propylene-diene monomer copolymers; halogen-modified products such as chlorinated polypropylene; and alloys or blends of polypropylene with other polymers.

Examples of other monomer units constituting a copolymer or alloy of a polypropylene include monomer units derived from monomers selected from the group consisting of: α-olefins such as ethylene, 1-butene, 1-pentene, 1-hexene, and 4-methyl-1-pentene; diene monomers such as butadiene, isoprene, chloroprene, and diene monomers; aromatic vinyl compounds such as vinyl acetate, (meth)acrylic acid esters, and styrene; and combinations thereof. The monomer preferably has 2 to 10 carbon atoms, and more preferably has 2 to 5 carbon atoms. Among these monomer units, ethylene units are often used, and the total amount of propylene units and ethylene units is preferably 70% by mass or more, and more preferably 85% by mass or more.

When the polypropylene is an alloy or blend of a polypropylene with other polymer, typical examples of other polymer include polyolefins other than polypropylene such as polyethylene. The polyethylene is a polymer containing ethylene units as main components, and may be a homopolymer or a copolymer such as an ethylene-propylene copolymer. In the case of a copolymer, the content of ethylene units in the polyethylene is preferably 50% by mass or more, and may be 70% by mass or more. Specific examples of the polyethylene include: homopolymers such as low-density polyethylene, high-density polyethylene, and linear low-density polyethylene; copolymers such as ethylene-diene monomer copolymers, ethylene-vinyl acetate copolymers, ethylene-acrylic acid ester copolymers, and ethylene-methacrylic acid ester copolymers; and halogen-modified products such as chlorinated polyethylene. By including a polyolefin other than polypropylene together with polypropylene, improvement in toughness or chemical resistance can be expected.

The ethylene-propylene copolymer is a polymer containing ethylene units and propylene units, and may be composed of only ethylene units and propylene units, or may further contain other monomer units in addition to ethylene units and propylene units. Examples of ethylene-propylene copolymers containing other monomer units include ethylene-propylene-diene monomer copolymers.

The method of producing the polypropylene has already been described in the explanation of the adhesive layer (B).

The polypropylene may be an acid-modified polypropylene. Acid modification increases affinity with the adhesive layer (B) and can also be expected to improve interfacial adhesion strength.

The acid compound used for acid modification, the acid modification method and conditions, and the acid modification amount are as already described in the explanation of the adhesive layer (B).

The polyphenylene ether may be the same as the polyphenylene ether used for the substrate layer (A).

An alloy of a polyphenylene ether and a polystyrene (sometimes referred to as modified polyphenylene ether) can be used as the polyphenylene ether, and the polyolefin/polyphenylene ether-based alloy may include a polystyrene. In this case, the mass ratio of the polystyrene in the tie layer (C) is preferably 50% by mass or less, more preferably 40% by mass or less, and particularly preferably 30% by mass or less. When the mass ratio of the polystyrene falls within such a range, the heat resistance of the multilayer sheet can be improved. The polystyrene is an optional component, and the polyolefin/polyphenylene ether-based alloy may not contain a polystyrene, or the tie layer (C) may not contain a polystyrene.

Typical examples of the polystyrene include general purpose polystyrene (GPPS), which is a polymer of only styrene, and high impact polystyrene (HIPS), which is GPPS added with rubber to provide impact resistance, but a copolymer of styrene with acrylonitrile or a (meth)acrylic acid ester can also be used. The copolymer used as the polystyrene contains monomer units derived from styrene as main components (for example, 50% by mass or more of all monomer units). When the polystyrene is a copolymer, the mass ratio of monomer units derived from comonomers other than styrene in the polystyrene is preferably 20% by mass or less, and more preferably 10% by mass or less. When the mass ratio of monomer units derived from comonomers is 20% by mass or less, the compatibility with the polyphenylene ether is improved and phase separation can be prevented.

For the purpose of improving toughness at low temperature and molding stability, and improving adhesiveness with the substrate layer (A) or the adhesive layer (B), a polymer other than the above-described polyolefin and polyphenylene ether (hereinafter, referred to as other polymer (C)) can be added to the tie layer (C).

Examples of other polymer (C) include: styrene block copolymers such as a styrene-butadiene-styrene block copolymer and a hydrogenated product thereof and a styrene-isoprene-styrene block copolymer and a hydrogenated product, which are described in the explanation of the compatibilizer; and graft copolymers obtained by grafting styrene homopolymers or copolymers to polyolefins. These copolymers contain styrene units as subcomponents (for example, 40% by mass or less of all monomer units). By having a polystyrene chain, other polymer (C) exhibits high miscibility with the polyphenylene ether. These block copolymers and graft copolymers may be copolymers in which reactive groups such as carboxylic acid (anhydride) groups, epoxy groups, and amino groups are added through acid modification with maleic anhydride etc., epoxy modification using an oxidizing agent, terminal amine modification, etc. These reactive groups may be used to improve interfacial adhesion strength with the adhesive layer.

When other polymer (C) is used, the content of other polymer (C) in the tie layer (C) is preferably 1% by mass or more, more preferably 2% by mass or more, and particularly preferably 3% by mass or more. When the addition amount falls within such a range, the improvement effect of other polymer (C) is enhanced.

When other polymer (C) is used, the content of other polymer (C) in the tie layer (C) is preferably 50% by mass or less, more preferably 20% by mass or less, and particularly preferably 10% by mass or less. When the addition amount falls within such a range, the multilayer sheet can have high heat resistance and high adhesion strength at high temperature.

The melt flow rate of the tie layer (C) is preferably 1 g/10 min or more, and more preferably 2 g/10 min or more. The melt flow rate of the tie layer (C) is preferably 50 g/10 min or less, and more preferably 30 g/10 min or less. If the melt flow rate of the tie layer (C) is below the lower limit, the melt viscosity becomes high and sheet molding becomes difficult. If the melt flow rate is above the upper limit, the melt tension becomes too low and sheet molding becomes also difficult.

The melt flow rate is a value measured according to JIS K7210:2014. The melt flow rate of the tie layer (C) is measured at a resin temperature of 300° C. and a load of 2.16 kg.

The tie layer (C) may further include an additive selected from the group consisting of antioxidants, ultraviolet absorbers, fillers, reinforcing fibers, release agents, processing aids, flame retardants, plasticizers, nucleating agents, antistatic agents, pigments, dyes, foaming agents, and combinations thereof.

The multilayer sheet of the present invention can be strongly adhered to adherends. When the adhesive layer (B) of the multilayer sheet is adhered to an adherend, particularly a SUS304 plate having a thickness of 0.1 mm, to prepare a bonded body, the normal temperature peel strength between the multilayer sheet and the adherend, particularly between the multilayer sheet and the SUS304 plate having a thickness of 0.1 mm, is preferably 2 N/10 mm or more, and more preferably 5 N/mm or more. The normal temperature is 23° C., and the normal temperature peel strength is measured under the conditions described in Examples described later.

The substrate layer (A) preferably has a thickness within a range of from 50 to 300 μm, more preferably has a thickness within a range of from 70 to 250 μm, and particularly preferably has a thickness within a range of from 100 to 200 μm. When the thickness of the substrate layer (A) is equal to or more than the lower limit, sufficient rigidity is obtained. When the thickness of the substrate layer (A) is equal to or less than the upper limit, influence on the thickness of an article incorporated with the multilayer sheet such as a battery can be reduced.

The adhesive layer (B) preferably has a thickness within a range of from 10 to 100 μm, more preferably has a thickness within a range of from 20 to 80 μm, and particularly preferably has a thickness within a range of from 30 to 70 μm. When the thickness of the adhesive layer (B) is equal to or more than the lower limit, occurrence of adhesion defects can be suppressed. When the thickness of the adhesive layer (B) is equal to or less than the upper limit, it is possible to prevent the adhesive from spreading out from the multilayer sheet and prevent the occurrence of defects in an article incorporated with the multilayer sheet such as a battery.

The tie layer (C) preferably has a thickness within a range of from 2 to 50 μm, more preferably has a thickness within a range of from 5 to 40 μm, and particularly preferably has a thickness within a range of from 10 to 30 μm. When the thickness of the tie layer (C) is equal to or more than the lower limit, sufficient adhesiveness is obtained. When the thickness of the tie layer (C) is equal to or less than the upper limit, influence on the thickness of an article incorporated with the multilayer sheet such as a battery can be reduced.

By controlling the thickness of each layer of the multilayer sheet within such a range, the multilayer sheet and the bonded body using it can exhibit excellent adhesion performance, durability, productivity, and economic efficiency.

Each of the substrate layer (A), the adhesive layer (B), and the tie layer (C) is generally produced from a resin composition, which is a raw material. The resin composition, which is a raw material of each of the substrate layer (A), the adhesive layer (B), and the tie layer (C), is a composition mainly composed of a resin, which is composed of the components of the substrate layer (A), the adhesive layer (B), or the tile layer (C) described above. The resin composition can be produced, for example, by a method of melt-kneading the resin as a main component and, if necessary, other components with an extruder, Banbury mixer, hot rolls, or the like, cooling and solidifying with water or the like while pulling a strand extruded from the nozzle hole of a die head, and cutting into pellets.

The melt-kneading temperature of the resin composition used for the substrate layer (A) is preferably from 150 to 320° C. and more preferably from 180 to 300° C., and the kneading time is usually from 0.5 to 20 minutes and preferably from 1 to 15 minutes.

The melt-kneading temperature of the resin composition used for the adhesive layer (B) is preferably from 150 to 270° C. and more preferably from 170 to 250° C., and the kneading time is usually from 0.5 to 20 minutes and preferably from 1 to 15 minutes.

The melt-kneading temperature of the resin composition used for the tie layer (C) is preferably from 150 to 320° C. and more preferably from 170 to 300° C., and the kneading time is usually from 0.5 to 20 minutes and preferably from 1 to 15 minutes.

The resin composition used for the substrate layer (A), the resin composition used for the adhesive layer (B), and the resin composition used for the tie layer (C) thus obtained can be made into multilayer sheets of various shapes according to the application by conventionally known methods such as compression molding, injection molding, extrusion molding, multilayer extrusion molding, profile extrusion molding, or hollow molding.

The substrate layer (A), the adhesive layer (B), and the tie layer (C) may be prepared in advance as sheets and then thermally laminated to form multilayers, or may be multilayered by simultaneously sheet-forming and multi-layering like multilayer extrusion molding. In either case, it is preferable to bring the substrate layer (A) and the tie layer (C) into contact with each other in a molten state of at least one of the substrate layer (A) or the tie layer (C), and bring the tie layer (C) and the adhesive layer (B) into contact with each other in a molten state of at least one of the tie layer (C) or the adhesive layer (B). It is more preferable to bring into contact with each other in a molten state of both the substrate layer (A) and the tie layer (C), and bring into contact with each other in a molten state of both the tie layer (C) and the adhesive layer (B). The contact temperature is preferably 160° C. or higher, more preferably 190° C. or higher, and particularly preferably 220° C. or higher. When the contact temperature is less than the lower limit, fusing of the adhesive layer (B) and the tie layer (C) and fusing of the tie layer (C) and the substrate layer (A) do not sufficiently proceed, which may result in insufficient interlayer adhesion strength. The substrate layer (A) and the adhesive layer (B) may be simultaneously or separately brought into contact with the tie layer (C).

The multilayer sheet of the present invention is preferably formed into a sheet by multilayer extrusion molding from the viewpoint of productivity and manufacturing cost. In general extrusion molding, a layered molten resin extruded from a T-die is cooled and stretched by rolls or the like to form a sheet. “Co-extrusion”, in which multiple resins are extruded at the same time, enables multilayer molding. Specific methods of co-extrusion include “feed block method” in which resins are merged before a T-die, and “multi-manifold method” in which single layers are each spread in a manifold and then merged at the lip, which is a discharge port of a T-die. Any of these methods may be used in the production of the multilayer sheet of the present invention, or other methods may also be used. Note that the multilayer sheet extruded by multilayer extrusion molding may be subsequently thermally laminated (thermocompression bonded) using a heating roll. Interlayer adhesion strength may be further improved by adding a thermal lamination step. The preferred temperature conditions for the thermal lamination step are as described above.

The multilayer sheet of the present invention can be adhered to adherends made of various materials such as metals, glass, ceramics, and plastics. Thereby, a bonded body including the multilayer sheet and the adherend can be produced. For example, a bonded body including the multilayer sheet can be used as a member or a component of a layered battery.

The metal used as the adherend may be a generally known metal plate, flat metal plate, or metal foil, and iron, copper, aluminum, lead, zinc, titanium, chromium, stainless steel, etc. can be used therefor. Among these, iron, aluminum, titanium, and stainless steel are particularly preferred.

Various thermoplastic resins or thermosetting resins can be used for the plastic used as the adherend. A composite material in which an inorganic material such as glass or ceramics, a filler such as metal or carbon, or a fiber is compounded with a resin may be used.

EXAMPLE

Examples are shown below to describe the present invention more specifically. In the following description, “parts” mean parts by mass and “%” means % by mass, unless otherwise specified. Further, “PPE” means polyphenylene ether, “PS” means polystyrene, “PP” means polypropylene, “PE” means polyethylene, and “MAH” means maleic anhydride, unless otherwise specified.

[Adhesive Layer (B)]

Ethylene-propylene-based maleic anhydride-modified polyolefin B1 was prepared. The PE/PP blending ratio and the amount of maleic anhydride of the maleic anhydride-modified polyolefin B1 were confirmed by the procedures described in (1) and (2) below.

(1) PE/PP Blending Ratio

Commercially available polyethylene resin (P9210, manufactured by Keiyo Polyethylene Co., Ltd.) and polypropylene resin (Waymax MFX3, manufactured by Japan Polypropylene Co., Ltd.) were melt-kneaded with an extruder at various blending ratios, and the resulting resin mixture was molded using a desktop press molding machine to produce a resin sheet with a thickness of about 2 mm.

Using Spectrum 100, manufactured by PerkinElmer, an IR spectrum was obtained from the cut surface of the resin sheet by attenuated total reflection method (ATR method). The PE absorbance ratio was determined from the absorbance at 719 $cm^{-1}$ (PE characteristic absorption) and the absorbance at 1167 $cm^{-1}$ (PP characteristic absorption) in the obtained IR spectrum. A calibration curve was created by plotting the absorbance ratio and the blending ratio at the time of melt-kneading. The results of the PE blending ratio and the PE absorbance ratio are shown in Table 1, and the results of the plot are shown in FIG. 1.

The number of repetitions was set to 4 or more in consideration of measurement errors. The approximate curve of this plot was utilized as a calibration curve for determining the PE/PP blending ratio.

TABLE 1

| PE blending ratio (wt %) | PE absorbance ratio (%) |
|---|---|
| 0 | 3, 1, 3, 2 |
| 10 | 35, 41, 36, 32, 34, 33, 38 |
| 20 | 43, 56, 47, 48, 50, 46, 46 |
| 30 | 61, 62, 61, 66, 58, 58, 57, 64, 64, 66, 64, 63, 63 |
| 50 | 81, 83, 83, 74, 77, 75 |
| 70 | 91, 92, 91, 88, 85, 89 |
| 100 | 100, 100, 98, 96, 99 |

The maleic anhydride-modified polyolefin B1 was molded into a resin sheet with a thickness of 2 mm, and the IR spectrum was similarly measured using the cross section thereof as the measurement surface. Based on the obtained IR spectrum, the created calibration curve was used to determine the PE/PP blending ratio of the maleic anhydride-modified polyolefin B1. The results are shown in Table 2.

(2) Amount of Maleic Anhydride

The amount of maleic anhydride grafted in the maleic anhydride-modified polyolefin B1 was quantified by neutralization titration. In the neutralization titration, the maleic anhydride-modified polyolefin B1 as a sample was heated and dissolved in xylene, and the obtained solution was titrated with an ethanol solution of potassium hydroxide using phenol red as an indicator. The amount of maleic anhydride was calculated from the titration results. The results for the amount of maleic anhydride are shown in Table 2.

(3) Melt Flow Rate

The melt flow rate (MFR) was measured using a commercially available melt indexer (G-02, manufactured by Toyo Seiki Seisakusho Co., Ltd.) in accordance with JIS K7210:2014 at a resin temperature of 230° C. and a load of 2.16 kg. The results are shown in Table 2.

TABLE 2

| Maleic anhydride- | Blending ratio (wt %) | | MAH amount | MFR |
|---|---|---|---|---|
| modified polyolefin | PP | PE | (wt %) | (g/10 min) |
| B1 | 18 | 82 | 0.7 | 14.2 |

[Tie Layer (C)]

PP/PPE alloys C1 to C6 with different PP/PPE blending ratios were prepared. The PP/PPE blending ratios of the PP/PPE alloys C1 to C6 were confirmed by the procedure described below.

Commercially available polypropylene resin (Waymax MFX3, manufactured by Nippon Polypropylene Co., Ltd.) and polyphenylene ether resin (PX100F, manufactured by Mitsubishi Engineering Plastics Co., Ltd.) were heated and dissolved in xylene at various mass ratios, precipitated with methanol, solidified and dried to obtain a PP/PPE blend.

Figure 2:
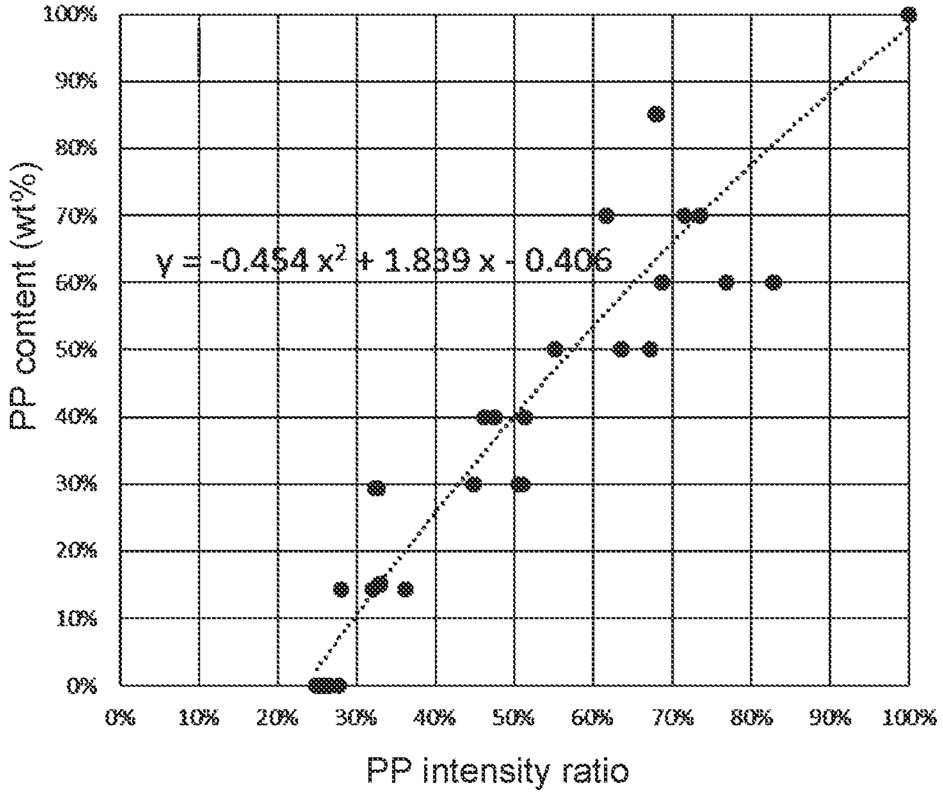
FIG. 2 is a calibration curve for converting the absorbance ratio of polypropylene to polyphenylene ether into mass ratio.

Using Spectrum 100, manufactured by PerkinElmer, an IR spectrum of the PP/PPE blend was obtained by attenuated total reflection method (ATR method). The PP absorbance ratio was determined from the absorbance at 2920 $cm^{-1}$ (PP characteristic absorption) and the absorbance at 1604 $cm^{-1}$ (PPE characteristic absorption) in the obtained IR spectrum. A calibration curve was created by plotting the absorbance ratio and the blending ratio during solution blending. The results of the PP blending ratio and the PP absorbance ratio are shown in Table 3, and the results of the plot are shown in FIG. 2. The approximate curve of the plot was used as a calibration curve for determining the PP/PPE blending ratio.

TABLE 3

| PP blending ratio (wt %) | PP absorbance ratio (%) |
|---|---|
| 0 | 26, 25, 26, 28, 27, 25 |
| 14 | 32, 36, 28 |
| 15 | 33, 33 |
| 29 | 32, 33 |
| 30 | 51, 45, 51 |
| 40 | 48, 46, 51 |
| 50 | 64, 67, 55 |
| 60 | 77, 69, 83 |
| 70 | 62, 72, 74 |
| 85 | 68, 68 |
| 100 | 100, 100, 100, 100, 100 |

The PP/PPE alloys C1 to C6 were molded into resin sheets with a thickness of 2 mm, and the IR spectra were measured using the cross section as the measurement surface. Based on the obtained IR spectra, the PP/PPE blending ratios of the PP/PPE alloys C to C6 were determined using the created calibration curves. The results are shown in Table 4. In Example 10, an alloy obtained by melt-kneading the PP/PPE alloy C3 and hydrogenated styrene-diene block copolymer (SEBS) at a mass ratio of 70/30 was used as the resin composition for the tie layer (C). In other examples, any of the PP/PPE alloys C1 to C6 was used as the resin composition for the tie layer (C).

TABLE 4

| | Blending ratio (wt %) | |
|---|---|---|
| PP/PPE alloy | PP | PPE |
| C1 | 12 | 88 |
| C2 | 30 | 70 |
| C3 | 35 | 65 |
| C4 | 41 | 59 |
| C5 | 49 | 51 |
| C6 | 75 | 25 |

[Substrate Layer (A)]

The resins described in "Substrate layer (A) composition" in Table 5 below were melt-kneaded at the blending ratio (% by mass) described in Table 5 to obtain a resin composition for the substrate layer (A). The melt flow rate, softening point, storage modulus, creep amount, and thermal change rate of the obtained resin composition for the substrate layer (A) were measured as described in (1) to (4) below. The results are shown in Table 5 together with the composition.

(1) Melt Flow Rate

The melt flow rate (MFR) was measured using a commercially available melt indexer (G-02, manufactured by Toyo Seiki Seisakusho Co., Ltd.) in accordance with JIS K7210:2014 at 300° C. and a load of 2.16 kg.

(2) Softening Point and Storage Modulus

The resin composition for the substrate layer (A) was molded into a sheet shape with a thickness of about 0.2 mm using a desktop press molding machine. This resin sheet was cut into a size of 10 mm×4.5 mm, and the viscoelastic properties were measured using a tensile viscoelasticity device (DMS6100, manufactured by Hitachi High-Tech Science). Specifically, the temperature was raised from room temperature to 250° C. at a frequency of 1 Hz and a temperature rising rate of 2° C./min, and changes in storage modulus, loss modulus, and tan δ due to temperature were recorded. The softening point was defined as a temperature at which the value of tan δ showed the maximum value.

(3) Compression Creep Test

The resin composition for the substrate layer (A) was molded into a sheet with a thickness of 1 mm using a desktop press molding machine. This resin sheet was cut into a size of 10 mm×10 mm, and five sheets were layered to prepare a sample with a thickness of 5 mm. Using a hot press machine (Digital Press CYPT-50, manufactured by Sintokogio, Ltd.), heating was performed at a temperature of 170° C. and a pressure of 6 MPa for 12 hours, and the ratio of the thickness change before and after the test to the thickness before the test was calculated as the creep amount (%).

(4) Thermal Shrinkage Test

The resin composition for the substrate layer (A) was molded into a sheet with a thickness of about 100 μm using a desktop press molding machine. This resin sheet was cut into a size of 200 mm×100 mm to prepare a sample. The prepared sample was suspended within a dryer at 180° C. for 30 seconds, and the thermal change rate was calculated from the dimensional change before and after heating. The thermal change rate is an average of the absolute value of the change rate at the long side and the absolute value of the change rate at the short side.

[Multilayer Sheet]

In each example, using the resin composition for the substrate layer (A), the maleic anhydride-modified polyolefin for the adhesive layer (B), and the resin composition for the tie layer (C) described in Table 5, a five-layer multilayer sheet described below was prepared and evaluated.

The resin composition for the substrate layer (A) was made into a substrate layer (A) with a thickness of about 150 μm using a desktop press molding machine. The maleic anhydride-modified polyolefin for the adhesive layer (B) was made into an adhesive layer (B) with a thickness of about 50 μm using a desktop press molding machine. The PP/PPE alloy for the tie layer (C) was made into a tie layer (C) with a thickness of about 25 μm using a desktop press molding machine. The substrate layer (A), the adhesive layer (B), and the tie layer (C) were layered in the order of adhesive layer (B)/tie layer (C)/substrate layer (A)/tie layer (C)/adhesive layer (B) and thermocompression bonding was performed for 10 seconds at the compression bonding temperature described in Table 5 using the same desktop press molding machine to obtain a five-layer sheet. Note that, in Comparative Example 1, a three-layer sheet of adhesive layer (B)/substrate layer (A)/adhesive layer (B) was prepared without providing a tie layer (C) and evaluated.

[Test Piece]

A SUS304 plate with a thickness of 0.1 mm was used as an adherend, and both surfaces of the multilayer sheet were sandwiched between SUS304 plates and thermocompression bonded (160° C., 10 seconds, 0.3 MPa) with a precision press to prepare a bonded body. This bonded body was cut into strips with a width of 10 mm to obtain test pieces. The adhesive portion of the test piece had a width of 10 mm and a length of 15 mm. The normal temperature peel strength, hot water peel strength, and constant load immersion fall time of the obtained test pieces were measured as described in (1) to (3) below.

(1) Normal Temperature Peel Test

In the normal temperature peel test, the SUS304 plate was peeled at a tensile speed of 50 mm/min at 23° C. using a tensile tester manufactured by Instron (Instron 5564), and the peel strength in a stable region was taken as the peel strength. The results are shown in Table 5 as normal temperature peel strength (N/10 mm).

(2) Hot Water Peel Test

In the hot water peel test, a load cell eDPU-50N manufactured by Imada Co., Ltd. was attached to a measurement stand MX2-1000N manufactured by Imada Co., Ltd., a heated water tank with a hook attached to the bottom was filled with hot water at 95° C., and the test piece was peeled water at 95° C. under a constant peeling load, and adhesion durability is evaluated by the time (fall time) until the SUS304 plate is peeled off. The test piece is the same as that used for measuring the peel strength. One of the handle portions of the test piece was connected to a fixed base with a wire, and the other was connected to a weight. The test piece was suspended in hot water at 95° C. together with the weight from the fixed base placed above the water surface, and a peeling load (1 N) was applied by the weight in water. At this time, the time required for the SUS304 plate as the adherend to be completely separated (fall time) was measured. The results are shown in Table 5 as constant load immersion fall time (hr).

TABLE 5

| | | Comparative Example 1 | Example 1 | Example 2 | Example 3 | Example 4 | Example 5 |
|---|---|---|---|---|---|---|---|
| Substrate layer (A) composition | 1000H (%) | 100 | 100 | 100 | 100 | 100 | 100 |
| | PX100F (%) | | | | | | |
| | MP10 (%) | | | | | | |
| Adhesive layer (B) composition | MAH modified polyolefin | B1 | B1 | B1 | B1 | B1 | B1 |
| | MAH content (%) | 0.7 | 0.7 | 0.7 | 0.7 | 0.7 | 0.7 |
| Tie layer (C) composition | PP/PPE alloy C1 (%) | | 100 | | | | |
| | PP/PPE alloy C2 (%) | | | 100 | | | |
| | PP/PPE alloy C3 (%) | | | | 100 | | |
| | PP/PPE alloy C4 (%) | No tie layer (C) | | | | 100 | |
| | PP/PPE alloy C5 (%) | | | | | | 100 |
| | PP/PPE alloy C6 (%) | | | | | | |
| | H1221 (%) | | | | | | |
| | PP/PPE mass ratio | — | 12/88 | 30/70 | 35/65 | 41/59 | 49/51 |
| Substrate layer (A) property | Softening point (° C.) | 196 | 196 | 196 | 196 | 196 | 196 |
| | 160° C. Storage modulus (MPa) | 1,985 | 1,985 | 1,985 | 1,985 | 1,985 | 1,985 |
| | 170° C. Storage modulus (MPa) | 1,779 | 1,779 | 1,779 | 1,779 | 1,779 | 1,779 |
| | MFR (g/10 min) | 5.7 | 5.7 | 5.7 | 5.7 | 5.7 | 5.7 |
| Substrate layer (A) heat resistance test | Compression creep test/creep amount (%) | 14 | 14 | 14 | 14 | 14 | 14 |
| | Thermal shrinkage test/thermal change rate (%) | 0.07 | 0.07 | 0.07 | 0.07 | 0.07 | 0.07 |
| Adhesion test of multilayer sheet | Compression bonding temperature (° C.) | 260 | 260 | 260 | 260 | 260 | 260 |
| | Normal temperature peel strength (N/10 mm) | <1 | 4.3 | 9.2 | 13.1 | 12.4 | 8.5 |
| | Hot water peel strength (N/10 mm) | <1 | 2.3 | 8.6 | 12.2 | 10.7 | 7.7 |
| | Constant load immersion fall time (hr) | <1 | 120 | >500 | >500 | >500 | >500 |

| | | Example 6 | Example 7 | Example 8 | Example 9 | Example 10 |
|---|---|---|---|---|---|---|
| Substrate layer (A) composition | 1000H (%) | 100 | 80 | | | 100 |
| | PX100F (%) | | | 80 | 70 | |
| | MP10 (%) | | 20 | 20 | 30 | |
| Adhesive layer (B) composition | MAH modified polyolefin | B1 | B1 | B1 | B1 | B1 |
| | MAH content (%) | 0.7 | 0.7 | 0.7 | 0.7 | 0.7 |
| Tie layer (C) composition | PP/PPE alloy C1 (%) | | | | | |
| | PP/PPE alloy C2 (%) | | | | | |
| | PP/PPE alloy C3 (%) | | 100 | 100 | 100 | 70 |
| | PP/PPE alloy C4 (%) | | | | | |
| | PP/PPE alloy C5 (%) | | | | | |
| | PP/PPE alloy C6 (%) | 100 | | | | |
| | H1221 (%) | | | | | 30 |
| | PP/PPE mass ratio | 77/23 | 35/65 | 35/65 | 35/65 | 35/65 |
| Substrate layer (A) property | Softening point (° C.) | 196 | 194 | 216 | 215 | 196 |
| | 160° C. Storage modulus (MPa) | 1,985 | 1,248 | 1,269 | 1,005 | 1,985 |
| | 170° C. Storage modulus (MPa) | 1,779 | 1,159 | 1,213 | 963 | 1,779 |
| | MFR (g/10 min) | 5.7 | 6.7 | 4.8 | 5.1 | 5.7 |
| Substrate layer (A) heat resistance test | Compression creep test/creep amount (%) | 14 | 23 | 22 | 26 | 14 |
| | Thermal shrinkage test/thermal change rate (%) | 0.07 | 0.21 | 0.11 | 0.17 | 0.07 |
| Adhesion test of multilayer sheet | Compression bonding temperature (° C.) | 260 | 260 | 260 | 260 | 260 |
| | Normal temperature peel strength (N/10 mm) | 7.1 | 11.5 | 12.7 | 9.5 | 11.2 |
| | Hot water peel strength (N/10 mm) | 6.5 | 8.6 | 10.5 | 8.3 | 6.3 |
| | Constant load immersion fall time (hr) | 430 | >500 | >500 | >500 | 350 |

while immersed in it to evaluate the peel strength in the same manner. The results are shown in Table 5 as hot water peel strength (N/10 mm).

(3) Adhesion Durability in Water

A constant load immersion test was conducted to evaluate the adhesion durability in water. The constant load immersion test is a test method in which a test piece is held in hot The details of the resins used for the substrate layer (A) and the tie layer (C) in Table 5 are as follows.

1000H: manufactured by Asahi Kasei Corporation, PPE-PS alloy Zylon 1000H, Tg=184° C. (DSC)

PX100F: manufactured by Mitsubishi Engineering Plastics Corporation, PPE PX100F, polyphenylene ether 100% by mass, Tg=204° C. (DSC)

MP10: manufactured by Asahi Kasei Corporation, terminal amine-modified hydrogenated styrene thermoplastic elastomer (SEBS), Tuftec MP10, styrene content 30%

H1221: manufactured by Asahi Kasei Corporation, hydrogenated styrene-diene block copolymer (SEBS), Tuftec H1221

As can be seen from the results in Table 5, using the PP/PPE alloy for the tie layer (C) significantly improved adhesion strength with the adherend and durability. In particular, using the PP/PPE alloys C2 to C5 with a PP/PPE mass ratio of from 30/70 to 49/51 enabled the multilayer sheet to have high peel strength.

INDUSTRIAL APPLICABILITY

The multilayer sheet of the present invention is useful for bonding and sealing metals and other materials, and can be suitably used for applications in which a resulting bonded body may come into contact with moisture continuously or intermittently. The multilayer sheet has a substrate layer (A) with excellent rigidity and heat resistance and a tie layer (C) with a specific blending is added to this, by which the interfacial strength of the substrate layer (A) and the adhesive layer (B) is improved and a strong bonded body can be formed. Therefore, the multilayer sheet of the present invention is useful as a constituent member of batteries, and can contribute to reduction in the number of parts and cost of batteries and significant improvement in productivity.

Examples of other applications include electric wires and cables in which metal conductors or optical fibers are coated with resin moldings, automotive mechanical parts, automotive exterior parts, automotive interior parts, molded substrates for power supply, light reflectors for light source reflection, fuel cases for solid methanol batteries, heat insulating materials for metal pipes, heat insulating materials for vehicles, fuel cell water pipes, decorative moldings, water cooling tanks, boiler exterior cases, ink peripheral parts and members for printers, water pipes, joints, secondary battery alkaline storage battery tanks, and gasket sealing materials for various layered batteries.

The disclosure of Japanese Patent Application No. 2021-102181, filed Jun. 21, 2021, is incorporated herein by reference in its entirety.

What is claimed is:

1. A multilayer sheet, comprising:

a substrate layer that comprises a polyphenylene ether; and an adhesive layer that comprises an acid-modified polyolefin, wherein the multilayer sheet further comprises, between the substrate layer and the adhesive layer, a tie layer that comprises a polyolefin/polyphenylene ether-based alloy.

2. The multilayer sheet according to claim 1, wherein the substrate layer comprises 40 to 99.9% by mass of the polyphenylene ether, 0 to 59.9% by mass of a polystyrene, and a polymer that is different from the polyphenylene ether and from the polystyrene.

3. The multilayer sheet according to claim 1, wherein the substrate layer has a softening point of 175° C. or higher.

4. The multilayer sheet according to claim 1, wherein the substrate layer has a storage modulus at 160° C. of 500 MPa or more.

5. The multilayer sheet according to claim 1, wherein the acid-modified polyolefin is a maleic anhydride-modified polyolefin.

6. The multilayer sheet according to claim 1, wherein a mass ratio of the polyolefin to the polyphenylene ether contained in the tie layer is from 15/85 to 80/20.

7. The multilayer sheet according to claim 1, wherein the tie layer comprises a styrene-diene block copolymer, a hydrogenated product of a styrene-diene block copolymer, or a polystyrene.

8. The multilayer sheet according to claim 1, wherein the substrate layer has a thickness of from 50 to 300 μm, the adhesive layer has a thickness of from 10 to 100 μm, and the tie layer has a thickness of from 2 to 50 μm.

9. The multilayer sheet according to claim 1, wherein a mass ratio of the polyphenylene ether in the substrate layer is 60% by mass or more.

10. The multilayer sheet according to claim 1, wherein the substrate layer further comprises a polystyrene or a styrene block copolymer.

11. A method of producing a multilayer sheet, the method comprising:

preparing a substrate layer that comprises a polyphenylene ether, an adhesive layer that comprises an acid-modified polyolefin, and a tie layer that comprises a polyolefin/polyphenylene ether-based alloy;

bringing the substrate layer and the tie layer into contact with each other in a molten state of 160° C. or higher of at least one of the substrate layer or the tie layer; and at the same time as or a different time from bringing the substrate layer and the tie layer into contact with each other, bringing the tie layer and the adhesive layer into contact with each other in a molten state of 160° C. or higher of at least one of the tie layer or the adhesive layer.

* * * * *